United States Patent [19]
Eichels et al.

[11] 3,773,356
[45] Nov. 20, 1973

[54] TRAILER HITCH GUIDE

[76] Inventors: Harry A. Eichels, 112 Grace Dr.;
Emil A. Grandbouche, 1918 Dewey Rd., both of Ashtabula, Ohio

[22] Filed: Feb. 22, 1972

[21] Appl. No.: 228,063

[52] U.S. Cl. .............................................. 280/477
[51] Int. Cl. ............................................. B60d 1/06
[58] Field of Search ................... 280/477, 501, 508, 280/478

[56] References Cited
UNITED STATES PATENTS

| | | | |
|---|---|---|---|
| 1,626,993 | 5/1927 | Williams | 280/477 |
| 2,151,920 | 3/1939 | Jandus et al. | 280/501 |
| 2,409,399 | 10/1946 | Solon | 280/477 |
| 3,420,549 | 1/1969 | Robinson | 280/477 |
| 3,675,947 | 7/1972 | Blagg | 280/477 X |
| 3,682,360 | 8/1972 | Fletcher et al. | 280/511 X |

*Primary Examiner*—Leo Friaglia
*Attorney*—Charles L. Lovercheck

[57] ABSTRACT

A guide for a trailer hitch to guide the female part of the hitch to position over the male ball so that the female part of the hitch will fall into place on the ball. The guide is made up of a base plate suitable to rest on the standard hitch ball. The base plate has a vertical stand welded to it and A U-shaped guide member fixed to the stand at a level near the top of the hitch ball. The base is adjustable, forwardly and rearwardly, to bring it to a position where the female hitch will engage the U-shaped guide part when it is directly over the hitch so that the female part of the hitch is guided directly down on the ball.

8 Claims, 3 Drawing Figures

PATENTED NOV 20 1973 3,773,356

TRAILER HITCH GUIDE

OBJECTS OF THE INVENTION

It is an object of the invention to provide a safety device for a trailer hitch.

Another object of the invention is to provide a guide member for guiding the female part of the trailer hitch to a position directly over the hitch ball.

Another object of the invention is to provide an improved trailer hitch guide for assisting in connecting a trailer to a towing vehicle.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
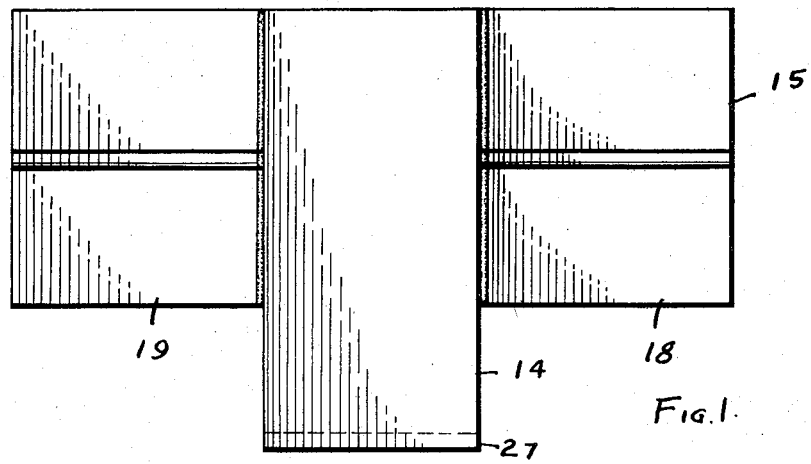
FIG. 1 is a front view of the trailer hitch guide according to the invention.
Figure 2:
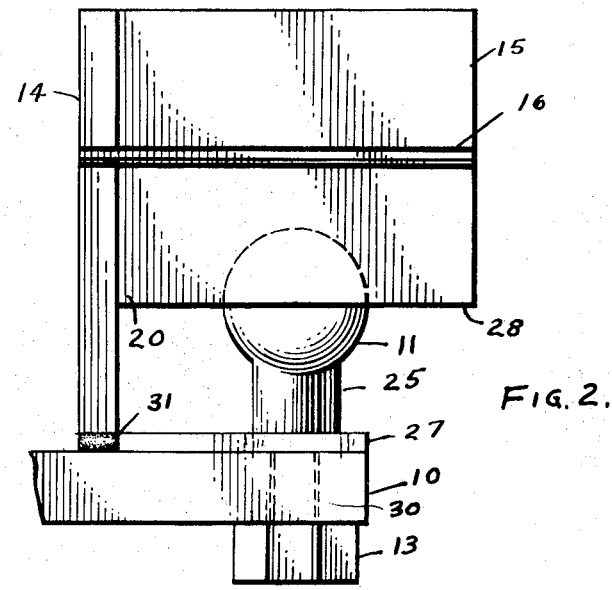
FIG. 2 is a side view of the hitch guide according to the invention.
Figure 3:
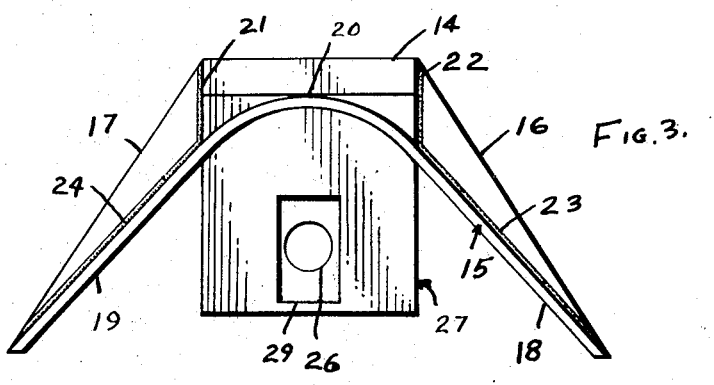
FIG. 3 is a top view of the trailer guide according to the invention.

Now with more particular reference to the drawings, the trailer hitch guide is made up principally of a base plate 27, a vertical stand 14, and a U-shaped guide member 15. The base member 27 is supported on the standard trailer hitch bar 10. The base plate 27 has a slot 29 in it which receives the threaded part 30 attached to the hitch ball. The threaded part 30 of the hitch ball extends through the hole 26 in the hitch bar and the nut 13 is threadably received on the threaded part 30 and clamps the base plate 27 to the hitch bar between the enlarged neck part 25 attached to the hitch ball 11.

The vertical stand 14 is welded to the base plate 27 at 31 and it extends upwardly therefrom. The vertical stand member 14 is in the form of a plate and it terminates at the upper edge of the U-shaped guide member 15. The U-shaped guide member 15 is in the form of a plate which is bent into the form of a U, having the diverging legs 18 and 19 connected together by an inermediate part 20. Gusset plates 16 and 17 are welded along the outer edge of the legs 18 and 19 at 23 and 24 and the ends of the gusset plates 16 and 17 are welded to the vertical stand 14 at 21 and 22. The opening 29 is approximately the same width as the outer diameter of the hole 26 so that the lower end of the neck 25 overlies the base plate 27 and clamps the plate 27 in position. By loosening the nut 13, the base plate 27 can be slid forward or rearward to adjust the surface of the intermediate part 20 to the correct position relative to the ball so that when the female member of the trailer engages the intermediate part 20, it will be directly over the ball 11 and can be dropped directly downward thereonto.

It will be noted that the lower edge 28 of the guide member 15 is located approximately at the center diameter portion of the ball 11.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A guide member for a trailer hitch having a ball and a hitch member for connecting said trailer to a vehicle comprising
   a U-shaped guide member,
   a vertical stand supporting said U-shaped guide member forward of said ball with the lower edge of said U-shaped member disposed approximately at the level of the center of said hitch ball,
   said U-shaped guide member having two diverging legs connected together by an intermediate part,
   said intermediate part being supported just forward of said ball at a distance from said ball such that said hitch will engage said ball when directly over said ball thereby guiding said hitch directly down onto said ball and said legs being adapted to deflect said hitch to a position over said ball.

2. The hitch recited in claim 1 wherein means is provided for adjusting said guide member forwardly and rearwardly whereby the opposite coupling part or socket is positioned directly over said ball when it engages said intermediate part.

3. The hitch guide recited in claim 1 wherein said U-shaped guide member is made of a platelike member formed into U-shape.

4. The hitch guide recited in claim 3 wherein said vertical stand supporting said U-shaped member comprises a vertically disposed stand in the form of a platelike member welded to said intermediate part of said U-shaped member.

5. The hitch guide recited in claim 4 wherein said means supporting said U-shaped member on said hitch further comprises a platelike base member adapted to rest on said hitch,
   said vertically disposed stand member is fixed to said base member and extends upwardly therefrom.

6. The hitch guide recited in claim 5 wherein said base plate has a slot therein,
   said slot being adapted to receive a threaded male part fixed to said hitch ball,
   and a neck of said hitch ball being adapted to rest on said base plate whereby said hitch guide is clamped to said hitch.

7. The hitch guide recited in claim 1 wherein the lower part of said U-shaped member is disposed at a level approximately equal to the level of the center of said hitch ball.

8. The hitch guide recited in claim 4 wherein a gusset plate is fixed to each side of said U-shaped member, and said gusset plate is fixed to said vertical stand.

* * * * *